United States Patent Office 3,808,297
Patented Apr. 30, 1974

3,808,297
HYDROPEROXY SUBSTITUTED CYCLIC
PHOSPHAMIDES
Akira Takamizawa and Tsuyoshi Iwata, Osaka, Japan, assignors to Shionogi & Co., Ltd., Osaka, Japan
No Drawing. Continuation-in-part of abandoned application Ser. No. 192,324, Oct. 26, 1971. This application May 1, 1972, Ser. No. 249,243
Claims priority, application Japan, June 28, 1971, 46/47,045; Sept. 8, 1971, 46/69,455; Feb. 24, 1972, 47/19,161
Int. Cl. C07d 105/04
U.S. Cl. 260—936
15 Claims

ABSTRACT OF THE DISCLOSURE

Cyclic phosphamide derivatives of the general formula:

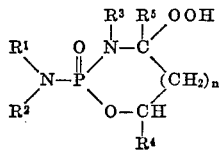

(wherein $R^1$ and $R^2$ are the same or different representing hydrogen atoms, lower alkyl groups, halogenated lower alkyl groups or aryl groups, or taken together with the nitrogen atom, a 3- to 6-membered heterocyclic ring; $R^3$ is a hydrogen atom, lower alkyl group, halogenated lower alkyl group or aryl group; $R^4$ and $R^5$ are the same or different representing hydrogen atoms or lower alkyl groups; $n$ represents a numerical 0 or 1)

being useful as medicaments showing antimicrobial, immunosuppressive and/or antitumor activities.

---

This invention is a continuation-in-part of our copending application Ser. No. 192,324 filed Oct. 26, 1971, now abandoned.

This invention relates to cyclic phosphamide derivatives and process for the preparation thereof. More particularly, this invention relates to novel and therapeutically valuable compounds having antimicrobial, immunosuppressive and/or antitumor activities.

The objective compounds of this invention may be represented by the following general formula

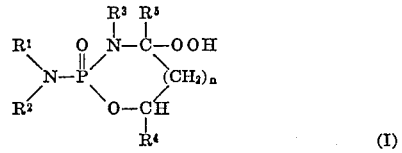

wherein $R^1$ and $R^2$ are the same or different and individually is a member selected from the group consisting of hydrogen atom, lower alkyl group, halogenated lower alkyl group and aryl group; alternatively, $R^1$ and $R^2$ represent, taken together with the nitrogen atom, a 3- to 6-membered heterocyclic ring; $R^3$ is a member selected from the group consisting of hydrogen atom, lower alkyl group, halogenated lower alkyl group and aryl group; $R^4$ and $R^5$ are the same or different and individually is a member selected from the group consisting of hydrogen atom and lower alkyl group; $n$ is a numerical 0 or 1.

The objective Compounds I can be prepared from phosphorodiamidates of the general Formula II by oxidation with ozone

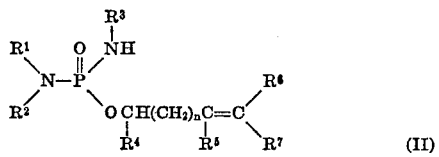

wherein $R^6$ and $R^7$ are the same or different and individually is a member selected from the group consisting of hydrogen atom, lower alkyl group, aralkyl group and aryl group; $R^1$, $R^2$, $R^3$, $R^4$, $R^5$ and $n$ each has the same meanings as mentioned above.

The lower alkyl group involves those having up to six carbon atoms, e.g., methyl, ethyl, n-propyl, isopropyl, n-butyl, isobutyl, sec-butyl, n-pentyl, n-hexyl and the like. The halogenated lower alkyl group involves those having up to six carbon atoms, e.g., 2-chloroethyl, 3-bromopropyl, 3-fluorobutyl and the like. The 3- to 6-membered ring involves aziridino, azetidino, pyrrolidino, piperidino and morpholino. The aryl group involves those having six to ten carbon atoms, e.g., phenyl, tolyl, xylyl, methoxyphenyl, chlorophenyl, bromophenyl, naphthyl, and the like. The aralkyl group involves those having seven to ten carbon atoms, e.g., benzyl, phenethyl, phenylpropyl, and the like.

The starting phosphorodiamidates (II) used in this invention are novel compounds and may be prepared, for example, as illustrated in the accompanying equation.

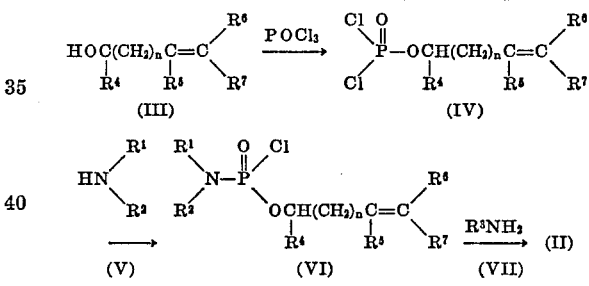

(wherein $R^1$, $R^2$, $R^3$, $R^4$, $R^5$, $R^6$, $R^7$ and $n$ each has the same meanings as mentioned above).

Substituted or unsubstituted 2-propen-1-ols ($n=0$) or 3-buten-1-ols ($n=1$) represented by the general Formula III are converted by reaction with phosphorus oxychloride into phosphorodichloridates of the general Formula IV, which are then converted by reaction with secondary amines or ammonia of the general Formula V into phosphoramidochloridates of the general Formula VI; the latter on reaction with primary amines or ammonia of the general Formula VII give the starting Compounds II.

Representative of the starting Compounds II are:

allyl N,N-bisethylphosphorodiamidate,
2-butenyl N,N-bis(2-chloroethyl)phosphorodiamidate,
2-butenyl N,N,N'-tris(2-chloroethyl)phosphorodiamidate,
2-methyl-2-propenyl N,N-bis(2-chloroethyl)phosphorodiamidate,
1-methyl-2-propenyl N,N-bis(2-chloroethyl)phosphorodiamidate,
cinnamyl N,N-bis(2-chloroethyl)phosphorodiamidate,
allyl N-ethyl-N',N'-bis-n-propylphosphorodiamidate,
2-butenyl N,N,N'-trimethylphosphorodiamidate, allyl aziridino-amidophosphonate,
cinnamyl (1-pyrrolidinyl)amidophosphonate,
2-butenyl N,N-bis(2-chloroethyl)-N'-phenylphosphorodiamidate,
allyl N,N-biphenylphosphorodiamidate,
2-butenyl N-(2-chloroethyl)-N'-phenylphosphorodiamidate,
3-butenyl N,N-diethylphosphorodiamidate,
3-pentenyl N,N-dimethylphosphorodiamidate,
3-butenyl N,N-bis(2-chloroethyl)phosphorodiamidate,
3-butenyl N,N-di-n-propyl-N'-methylphosphorodiamidate,
3-butenyl N,N-bis(2-chloroethyl)-N'-phenylphosphorodiamidate,
3-butenyl N,N-bis(3-bromopropyl)-N'-ethylphosphorodiamidate,
3-butenyl N,N-bis(4-flurobutyl)phosphorodiamidate,
3-n-butyl-4-phenyl-3-butenyl N,N-di-n-butylphosphorodiamidate,
3-butenyl N,N'-bis(2-chloroethyl)phosphorodiamidate,
5-phenyl-3-pentenyl N,N'-bis(2-chloroethyl)phosphorodiamidate,
3-butenyl N-(2-chloroethyl)phosphorodiamidate,
3-butenyl N,N,N'-tris(2-chloroethyl)phosphorodimidate,
3-butenyl N,N-bis(2-chloroethyl)-N'-methylphosphorodiamidate,
3-butenyl N-(2-chloroethyl)-N'-N'-diethylphosphorodiamidate,
3-butenyl N-phenylphosphorodiamidate,
3-butenyl N-(2-chloroethyl)-N'-phenylphosphorodiamidate,
3-butenyl N,N'-bi-p-tolylphosphorodiamidate,
3-butenyl aziridino-amidophosphonate,
3-butenyl azetidino-N-methylamidophosphonate,
3-butenyl piperidino-N-(2-chloroethyl)amidophosphonate,
3-butenyl morpholino-N-(2-chloroethyl)amidophosphonate, and
3-hexeneyl pyrrolidino-N-ethylamidophosphonate.

The reaction of this invention is carried out in a conventional manner for ozone oxidation using a usual apparatus for ozone oxidation. For example, oxygen or air containing ozone produced by an ozone generator is introduced into a solution of the starting Compound II in a suitable solvent at room temperature or under ice-cooling. The suitable solvent involves those usually used in ozonization, for example, methyl chloride, ethyl chloride, chloroform, dichloromethane, dichloroethane, tetrachloroethane, petroleum ether, hexane, cyclohexane, petroleum benzin, ligroin, benzene, toluene, tetrahydrofuran, dioxane, acetone, methyl ethyl ketone, or a mixture of them with or without water. The reaction mixture containing ozone is usually kept at room temperature or under cooling (from 35° C. to —20° C.) for a period of from several hours to several days. In this reaction, it is appropriate to add a peroxide (e.g., hydrogen peroxide) into the reaction mixture in some cases after the introduction of ozone, but the addition of peroxide is not always an essential condition. The objective product (I) may be isolated from the reaction mixture and purified in a conventional manner such as extraction, distillation, chromatography, recrystallization and so on.

Representative of the object Compounds I are:

2-diethylamino-4-hydroperoxy-1,3,2-oxazaphospholidine 2-oxide,
2-[bis(2-chloroethyl)amino]-4-hydroperoxy-1,3,2-oxazaphospholidine 2-oxide,
2-[bis(2-chloroethyl)amino]-3-(2-chloroethyl)-4-hydroperoxy-1,3,2-oxazaphospholidine 2-oxide,
2-[bis(2-chloroethyl)amino]-4-methyl-4-hydroperoxy-1,3,2-oxazaphospholidine 2-oxide,
2-[bis(2-chloroethyl)amino]-5-methyl-4-hydroperoxy-1,3,2-oxazaphospholidine 2-oxide,
2-[bis(2-chloroethyl)amino]-5-n-butyl-4-hydroperoxy-1,3,2-oxazaphospholidine 2-oxide,
2-di-n-propylamino-3-ethyl-4-hydroperoxy-1,3,2-oxazaphospholidine 2-oxide,
2-dimethylamino-3-methyl-4-hydroperoxy-1,3,2-oxazaphospholidine 2-oxide,
2-aziridino-4-hydroperoxy-1,3,2-oxazaphospholidine 2-oxide,
2-(1-pyrrolidinyl)-4-hydroperoxy-1,3,2-oxazaphospholidine 2-oxide,
2-[bis(2-chloroethyl)amino]-3-phenyl-4-hydroperoxy-1,3,2-oxazaphospholidine 2-oxide,
2-biphenylamino-4-hydroperoxy-1,3,2-oxazaphospholidine 2-oxide,
3-(2-chloroethyl)-2-anilino-4-hydroperoxy-1,3,2-oxazaphospholidine 2-oxide,
2-diethylamino-4-hydroperoxy-tetrahydro-2H-1,3,2-oxazaphosphorine 2-oxide,
2-dimethylamino-4-hydroperoxy-tetrahydro-2H-1,3,2-oxazaphosphorine 2-oxide,
2-[bis(2-chloroethyl)amino]-4-hydroperoxy-tetrahydro-2H-1,3,2-oxazaphosphorine 2-oxide,
2-di-n-propylamino-3-methyl-4-hydroperoxy-tetrahydro-2H-1,3,2-oxazaphosphorine 2-oxide,
2-[(2-chloroethyl)amino]-3-phenyl-4-hydroperoxy-tetrahydro-2H-1,3,2-oxazaphosphorine 2-oxide,
2-[bis(3-bromopropyl)amino]-3-ethyl-4-hydroperoxy-tetrahydro-2H-1,3,2-oxazaphosphorine 2-oxide,
2-[bis(4-fluorobutyl)amino]-4-hydroperoxy-tetrahydro-2H-1,3,2-oxazaphosphorine 2-oxide,
2-di-n-butylamino-4-n-butyl-4-hydroperoxy-tetrahydro-2H-1,3,2-oxazaphosphorine 2-oxide,
2-(2-chloroethyl)amino-3-(2-chloroethyl)-4-hydroperoxy-tetrahydro-2H-1,3,2-oxazaphosphorine 2-oxide,
2-(2-chloroethyl)amino-4-hydroperoxy-tetrahydro-2H-1,3,2-oxazaphosphorine 2-oxide,
2-[bis(2-chloroethyl)amino]-3-(2-chloroethyl)-4-hydroperoxy-tetrahydro-2H-1,3,2-oxazaphosphorine 2-oxide,
2-[bis(2-chloroethyl)amino]-3-methyl-4-hydroperoxy-tetrahydro-2H-1,3,2-oxazaphosphorine 2-oxide,
2-diethylamino-3-(2-chloroethyl)-4-hydroperoxy-tetrahydro-2H-1,3,2-oxazaphosphorine 2-oxide,
2-anilino-4-hydroperoxy-tetrahydro-2H-1,3,2-oxazaphosphorine 2-oxide,
2-anilino-3-(2-chloroethyl)-4-hydroperoxy-tetrahydro-2H-1,3,2-oxazaphosphorine 2-oxide,
2-toluidino-3-tolyl-4-hydroperoxy-tetrahydro-2H-1,3,2-oxazaphosphorine 2-oxide,
2-aziridino-4-hydroperoxy-tetrahydro-2H-1,3,2-oxazaphosphorine 2-oxide,
2-azetidino-3-methyl-4-hydroperoxy-tetrahydro-2H-1,3,2-oxazaphosphorine 2-oxide,
3-(2-chloroethyl)-2-piperidino-4-hydroperoxy-tetrahydro-2H-1,3,2-oxazaphosphorine 2-oxide,
3-(2-chloroethyl)-2-morpholino-4-hydroperoxy-tetrahydro-2H-1,3,2-oxazaphosphorine 2-oxide, and
3-ethyl-2-pyrrolidino-4-hydroperoxy-tetrahydro 2H-1,3,2-oxazaphosphorine 2-oxide, The Compounds I prepared in this invention are useful as antimicrobial agents, immunosuppressive agents and/or anti-tumor agents. The antimicrobial activity of the Compounds I, for example, 2-[bis(2-chloroethyl)amino]-4-hydroperoxy-tetrahydro-2H-1,3,2-oxazaphosphorine 2-oxide (hereinafter referred as "Compound A") and 2-(2-chloroethyl)amino-3-(2-chloroethyl) - 4 - hydroperoxy-tetrahydro-2H-1,3,2-oxazaphosphorine 2 - oxide (hereinafter referred as "Compound B"), assayed by the agar dilution method using a synthetic medium (Davis & Mingioli: J. Bac., vol. 60, 17 (1950)) was as follows: in the tests on *Bacillus subtilis* PCI 219, *Escherichia coli* NIHJ JC–2, *Salmonella typhimurium*, and *Pseudomonas aeruginosa*, Compound A showed 6.3 mcg./ml. of the minimum inhibitory concentrations, and Compound B, 6.3–12.5 mcg./ml., respectively. Further, the immune suppression activity of the Compounds I was compared with commercially available immuno-suppressive agents, azathioprine and cyclophosphamide. Table I indicates the results of test.

Test method: To a group of DS female mice, sheep red blood cells ($10^8$/mouse) are intraperitoneally injected for immunization. Test compounds are also intraperitoneally administered at the time of immunization, and their antisera are separated. Hemagglutination titer of the antisera is measured according to the microtiter method, and expressed as $log_2$ reciprocals of the end point dilution. The antibody resistant to 2-mercaptoethanol is determined similarly after treating the separated antisera with 0.1 M 2-mercaptoethanol.

Test method: Cells are removed from the glass with 0.03% trypsin and 0.04% ethylene diamine tetraacetic acid solutions. Dispersed cells are centrifuged and resuspended in Eagle's minimum essential medium supplemented with 10% bovine serum. About 100,000 cells in 1 ml. of medium are implanted in a series of triplicate culture tubes and the tubes are incubated at 37° C. After 3 days the medium is removed, and fresh medium containing the test compound is added. The cell number is determined 2 days thereafter by an electronic cell counter. The effective dose for 50% cell growth inhibition ($ED_{50}$) is determined graphically [J. Leiter et al.,

TABLE I.—EFFECT ON ANTIBODY FORMATION TO SHEEP RED BLOOD CELLS IN MICE

| | | Antibody titer | | | | | |
|---|---|---|---|---|---|---|---|
| | | Exp. 1 | | Exp. 2 | | Exp. 3 | |
| Test compound | Dose (mg./kg.) | Total | 2-ME resist | Total | 2-ME resist | Total | 2-ME resist |
| Saline | | 6.5 | 2.8 | 7.4 | 3.2 | 6.8 | 2.1 |
| Azathioprine | 750 | | | 0 | 0 | | |
| | 500 | | | 3.8 | 0 | | |
| | 250 | | | 5.9 | 0.4 | | |
| Cyclophosphamide | 69 | 1.0 | 0 | 2.1 | 0 | 1.7 | 0 |
| | 34.5 | | | 5.8 | 2.1 | | |
| Compound: | | | | | | | |
| A | 69 | 0.4 | 0 | 1.6 | 0 | 1.0 | 0 |
| | 34.5 | | | 6.5 | 3.3 | | |
| B | 69 | 0.6 | 0.6 | | | 0 | 0 |
| | 34.5 | 4.0 | 0 | | | 4.0 | 0 |
| | 17.3 | 7.0 | 3.0 | | | 6.3 | 1.4 |

Note.—2-ME resist=2-mercaptoethanol resistant; Exp.=Experimental.

Accordingly, the present Compounds I are more potent in immune suppression than azathioprine. Moreover, the present Compounds I show excellent antitumor activity against Yoshida sarcoma, Leukemia L-1210, and other tumors. For example, the antitumor activity of the Compounds I against Leukemia L-1210 was compared with a commercially available antitumor agent, cyclophosphamide, as indicated in Table II.

TABLE II.—ANTITUMOR ACTIVITY AGAINST LEUKEMIA L-1210

| Test compound | Dose (mg./kg.) | Number of mice | Survival time Days | Survival time Index | Survivors over 30 days |
|---|---|---|---|---|---|
| Control | 0 | 10 | 8.8 | 1.00 | 0 |
| Cyclophosphamide | 20 | 8 | 10.1 | 0.87 | 0 |
| | 60 | 8 | 17.3 | 0.50 | 2 |
| Compound: | | | | | |
| A | 20 | 8 | 17.6 | 0.50 | 2 |
| | 60 | 8 | 26.6 | 0.33 | 6 |
| B | 30 | 8 | >25.0 | >0.35 | 6 |
| | 60 | 8 | >30.0 | >0.29 | 8 |

Test method: Each animal in a group (C57BL x DBA/2) $F_1$ female mice, weighing from 16 to 18 g., is intraperitoneally inoculated with 15,000 Leukemia L-1210 cells. Test compounds are injected intraperitoneally 24 hours after inoculation and the number of days survival time is observed. The survival index is calculated as the ratio of the average survival time of the group of control mice to that of the group of treated mice. To the group of control mice, 10% ethanolic solution (0.1 ml./mouse) is intraperitoneally administered.

Accordingly, it can be seen that the Compounds I are more potent with regard to antitumor activity against Leukemia L-1210 than cyclophosphamide. Further, the cell growth inhibitory activity in HeLa cells of the Compounds I was compared with that of cyclophosphamide. The $ED_{50}$ of "Compound A" was 0.9 mcg./ml. and that of "Compound B," 3.4 mcg./ml., while the $ED_{50}$ of cyclophosphamide was over 100 mcg./ml. The Compounds I were effective for cell growth inhibition in HeLa cells in vitro, while cyclophosphamide was not effective at all.

Cancer Research, vol. 22, supplement, 837–841 (1961)].

Acute toxicity of the Compounds I was as follows: $LD_{50}$ of "Compound A" in mice, 181 mg./kg., and that of "Compound B," 250 mg./kg. by intraperitoneal administration.

Test method: The compound is administered intraperitoneally to each of a group of DS female mice, each animal weighing from 16 to 18 g. The mice are observed for 50 days after administration. The $LD_{50}$ is calculated by van der Wärden's method.

The cyclic phosphamide derivatives (I) can be administered alone or in combination with pharmaceutically acceptable carriers, the choice of which depends on the preferred route of administration, solubility of the materials, and pharmaceutical practice. In general, the dosage of the Compounds I is approximately of the same order as the practical dosage of cyclophosphamide, that is, they may be administered in single or divided doses containing from 50 mg. to 500 mg. of the active ingredient. The Compounds I are useful for treating various types of mammalian bacterial infections, autoimmune diseases, homograft rejection or tumors. Practical examples of pharmaceutical preparations with the Compounds I are tablets, capsules, pills, suspensions, emulsions, solutions, suppositories, ointments, granules, and powders. In the preparation of tablets, for example, the Compounds I can be combined with binders such as gum tragacanth, acacia, corn starch, gelatin, etc. It is also usually desirable to have a disintegrating agent or diluent such as corn starch, potato, wheat starch, alginic acid or the like. Also, preferably present is a lubricant such as stearic acid, magnesium sterate, or talc along with a sweetening agent such as saccharin. The composition when used in the form of a suspension or solution may be combined with a syrup or sorbitol type vehicle including a viscosity controller such as magnesium aluminum silicate, methocel, or carboxymethyl cellulose, and a suitable preservative such as sodium benzoate, methyl paraben, or propyl paraben.

The compositions containing the Compounds I can be dispersed in dosage unit forms for a single daily therapeutic dose, in smaller units for multiple doses, or in larger units for dividing into single doses. Parenteral compositions can also be prescribed in single units, or in larger quantities from which each single dosage will be withdrawn before use.

The invention will now be further described by way of specific examples. In these examples, the temperatures are given in degrees centigrade.

EXAMPLE 1

To a solution of 4.1 g. of 3-butenyl N,N-bis(2-chloroethyl)phosphorodiamidate in 15 ml. of aqueous acetone (acetone:water=2:1) is bubbled ozone at a rate of 20–30 mg./min. for 50 minutes under ice-cooling. To this reaction mixture is then added 2.0 ml. of 30% hydrogen peroxide, and the mixture allowed to stand at 2° C. for 72 hours. Then, 100 ml. of ether is added thereto and washed with water. The ether layer is passed through a column of silica gel and eluated with a mixture of ether and ethyl acetate. The elution is condensed to give crude crystals, which on recrystallization from acetone-ether give 850 mg. of 2 - [bis(2-chloroethyl)amino]-4-hydroperoxy-tetrahydro - 2H-1,3,2-oxazaphospholine 2-oxide as white crystals having M.P. 107–108° C.

IR: $\nu_{max.}^{Nujol}$ 3420, 3070, 1220, 1045, 750 cm.$^{-1}$

Analysis.—Calcd. for $C_7H_{15}N_2O_4PCl_2$ (percent): C, 28.69; H, 5.16; N, 9.56; P, 10.57; Cl, 24.20. Found (percent): C, 28.46; H, 5.03; N, 9.36; P, 10.40; Cl, 23.92.

EXAMPLE 2

To a solution of 550 mg. of 3-butenyl N,N-bis(2-chloroethyl)phosphorodiamidate in aqueous acetone (acetone:water=2:1) is bubbled ozone at a rate of 15 mg./min. for 15 minutes under ice-cooling. The reaction mixture is allowed to stand at 2° C. for 48 hours, and then, 50 ml. of ether is added thereto and washed with water. The ether layer is passed through a column of silica gel, eluated with a mixture of ether and ethyl acetate, and evaporated to dryness. The resulting crude crystals are recrystallized from acetone-ether to give 45 mg. of the same product as that of Example 1.

EXAMPLE 3

To a solution of 498 mg. of 3-pentenyl N,N-bis(2-chloroethyl)phosphorodiamidate in 6 ml. of aqueous acetone (acetone:water=2:1) is bubbled 124 mg. of ozone under ice-cooling and then added 0.3 ml. of 30% hydrogen peroxide. The mixture is allowed to stand overnight in a refrigerator, and then, shaken with 20 ml. of chloroform and 10 ml. of water. The aqueous layer is further extracted with 10 ml. of chloroform. The chloroform layers are combined, washed with water, dried and evaporated to dryness. The resulting oily material is crystallized from ether to give 220 mg. of the same product as that of Example 1.

EXAMPLE 4

5-phenyl-3-pentenyl N,N-bis(2-chloroethyl)phosphorodiamidate is oxidized with ozone in the same manner as that of Example 1 to give the same product as that of Example 1.

EXAMPLE 5

To a solution of 400 mg. of 4-phenyl-3-butenyl N,N-bis(2-chloroethyl)phosphorodiamidate in a mixture of 4 ml. of acetone and 2 ml. of water is bubbled 82 mg. of ozone under ice-cooling. To this reaction mixture is then added 0.3 ml. of 30% hydrogen peroxide, and the mixture allowed to stand for 2 days under cooling. Then, 5 ml. of water and 20 ml. of chloroform are added thereto and separated into an aqueous layer and a chloroform layer. The aqueous layer is extracted with 5 ml. of chloroform and the extract combined with the chloroform layer. The chloroform layer is washed with water, dried over anhydrous sodium sulfate and evaporated to dryness to give an oily residue. This is crystallized from ether under cooling to give 80 mg. of the same product as that of Example 1.

EXAMPLE 6

To a solution of 12 g. of 2-butenyl N,N-bis(2-chloroethyl)-phosphorodiamidate in 40 ml. of acetone and 20 ml. of water is bubbled 3.2 g. of ozone under ice-cooling, and then there is added 8 ml. of 30% hydrogen peroxide. The mixture is allowed to stand at 2° C. for 4 days, and the precipitated crystals are collected by filtration, washed with ether, dried and recrystallized from methanol to give 8.0 g. of 2-[bis(2-chloroethyl)amino]-4-hydroperoxy-1,3,2-oxazaphospholidine 2-oxide having M.P. 135–135.5° C. (decomp.).

IR: $\nu_{max.}^{Nujol}$ 3406, 3186, 1225, 1137, 1107, 1092, 975, 850, 820 cm.$^{-1}$ Analysis.—Calcd. for $C_6H_{13}N_2O_4PCl_2$ (percent): C, 25.82; H, 4.70; N, 10.04; P, 11.10; Cl, 25.41. Found (percent): C, 26.89; H, 4.86; N, 10.03; P, 10.17; Cl, 25.64.

EXAMPLE 7

In the same manner as Example 6, 3-phenyl-2-propenyl N,N - bis(2-chloroethyl)phosphorodiamidate is oxidized with ozone to give 2-[bis(2-chloroethyl)amino]-4-hydroperoxy-1,3,2-oxazaphospholidine 2-oxide in 54% yield.

EXAMPLE 8

Into a solution of 1.0 g. of 1-methyl-2-propenyl N,N-bis-2-chloroethyl)phosphorodiamidate in 20 ml. of aqueous acetone (acetone:water=2:1) is bubbled 264 mg. of ozone under ice-cooling over a period of 12 minutes, and then there is added 1.5 ml. of 30% hydrogen peroxide. The mixture is allowed to stand at 0° C. for 2 days, and then acetone distilled off under reduced pressure. The residual aqueous solution is extracted with chloroform, and the extract washed with water, dried over anhydrous sodium sulfate, and evaporated to dryness to give a crystalline residue. This is washed with a mixture of acetone and ether and recrystallized from acetone-chloroform to give 480 mg. of 2-[bis(2-chloroethyl)amino]-4-hydroperoxy-5-methyl-1,3,2-oxazaphospholidine 2-oxide as colorless needles having M.P. 124–126° C.

IR: $\nu_{max.}^{Nujol}$ 3250, 1210, 1030, 930 cm.$^{-1}$

NMR: $\tau$ ($d_6$-dimethylsulfoxide: —1.71 (1H, singlet), 3.70 (1H, double doublet; $J_{H,P}$=20 cps., $J_{H,H}$=2.5 cps.), 5.09 (1H, double triplet; $J_{H,P}$=23 cps.; $J_{HNH}$=2.5 cps.), 5.60 (1H, multiplet), 6.1–7.0 (8H, multiplet), 8.72 (3H, doublet; J=7 cps.).

Analysis.—Calcd. for $C_7H_{15}N_2O_4PCl_2$ (percent): C, 28.69; H, 5.16; N, 9.56; P, 10.57; Cl, 24.20. Found (percent): C, 28.78; H, 5.18; N, 9.65; P, 10.31; Cl, 24.03.

EXAMPLE 9

Into a solution of 1.1 g. of 2-methyl-2 propenyl N,N-bis-(2-chloroethyl)phosphorodiamidate in 20 ml. of aqueous acetone (acetone:water=2:1) is bubbled 300 mg. of ozone under ice-cooling over a period of 20 minutes, and then there is added 2.0 ml. of 30% hydrogen peroxide. The mixture is allowed to stand at 0° C. for 2 days, and condensed under reduced pressure. The residue is treated with sodium chloride to salt out and extracted with chloroform. The extract is dried over anhydrous sodium sulfate and evaporated to dryness to give a colorless oily material, which is passed through a column of silica gel and eluated with acetone to give 460 mg. of 2-[bis(2-chloroethyl)amino] - 4 - hydroperoxy-4-methyl-1,3,2-oxazaphospholidine 2-oxide as a colorless oily material.

IR: $\nu_{max.}^{film}$ 3280, 1225, 1040, 985 cm.$^{-1}$

NMR: $\tau$ (CDCl$_3$): 4.96 (1H, multiplet), 5.2–6.1 (2H, multiplet), 6.2–7.2 (9H, multiplet), 8.43 (3H, singlet).

EXAMPLE 10

Into a solution of 596 mg. of 2-butenyl N,N,N'-tris(2-chloroethyl)phosphorodiamidate in 5 ml. of acetone and 2.5 ml. of water is bubbled 128 mg. of ozone under ice-cooling, and then there is added 0.3 ml. of 30% hydrogen peroxide. The mixture is allowed to stand at 2° C. for 5 days and condensed under reduced pressure, and the residue is extracted with chloroform. The extract is washed with water, dried and evaporated to dryness. The oily residue is passed throug ha column of silica gel and eluated with ethyl acetate to give 400 mg. of 2-[bis(2-chloroethyl)amino]-3-(2-chloroethyl)-4-hydroperoxy-1,3,2-oxazaphospholidine 2-oxide as a colorless oil.

EXAMPLE 11

Into a solution of 1.05 g. of 3 - butenyl N,N - bis(2-chloroethyl)-N'-phenyl-phosphorodiamidate in 10 ml. of aqueous acetone (acetone:water=2:1) is bubbled 216 mg. of ozone under ice-cooling, and then there is added 0.6 ml. of 30% hydrogen peroxide. The mixture is allowed to stand at 2° C. for 20 hours and then condensed under reduced pressure. The residue is extracted with chloroform, washed with water, dried over anhydrous sodium sulfate, and evaporated to dryness. The resulting oily material is purified by passing through a column of silica gel to give 246 mg. of 2-[bis(2-chloroethyl)amino] - 4 - hydroperoxy-3-phenyl-tetrahydro - 2H - 1,3,2 - oxazaphospholine 2-oxide as an oily material.

IR: $\nu_{max.}^{film}$ 3226, 1606, 1500, 1220, 756 cm.$^{-1}$

EXAMPLE 12

Into a solution of 2.4 g. of 3-butenyl N,N'-bis(2-chloroethyl)phosphorodiamidate in 20 ml. of aqueous acetone (acetone:water=2:1) is bubbled 510 mg. of ozone under ice-cooling over a period of 12 minutes, and then there is added 2 ml. of 30% hydrogen peroxide. The mixture is allowed to stand at 0° C. for 2 days and condensed under reduced pressure. The residual aqueous solution is treated with sodium chloride to salt out, and extracted with chloroform. The extract is dried over anhydrous sodium sulfate and evaporated to dryness. The resulting oily residue is crystallized from ether-acetone to give 1.20 g. of 2-(2-chloroethyl)amino-3-(2 - chloroethyl) - 4 - hydroperoxy-tetrahydro-2H-1,3,2-oxazaphospholine 2 - oxide as colorless prisms having M.P. 101–103° C.

IR: $\nu_{max.}^{Nujol}$ 3290, 3200, 1188, 1050, 981 cm.$^{-1}$

NMR: $\tau$(d$_6$-dimethylsulfoxide): $-1.15$ (1H, singlet), 5.05 (1H, double triplet; J$_{H,P}$=19 cps., J$_{H,H}$=3 cps.), 5.68 (2H, multiplet), 6.0–7.2 (8H, multiplet), 7.91 (2H, multiplet).

Analysis.—Calcd. for C$_7$H$_{15}$N$_2$O$_4$PCl$_2$ (percent): C, 28.69; H, 5.16; N, 9.56; P, 10.57; Cl, 24.20. Found (percent): C, 29.16; H, 5.29; N, 9.78; P, 9.45; Cl, 23.65.

EXAMPLE 13

In the same manner as Example 12, 5-phenyl-3-pentenyl N,N'-bis(2 - chloroethyl)phosphorodiamidate is oxidized with ozone to give 2-(2-chloroethyl)amino-3(2 - chloroethyl)-4-hydroperoxytetrahydro - 2H - 1,3,2 - oxazaphospholine 2-oxide in 42.6% yield.

EXAMPLE 14

Into a solution of 1.4 g. of 3-butenyl piperidino-N-(2-chloroethyl)amidophosphonate in 12 ml. of aqueous acetone (acetone:water=2:1) is bubbled 360 mg. of ozone under ice-cooling, and then there is added 1.0 ml. of 30% hydrogen peroxide. The mixture is allowed to stand at 2° C. for 17 hours and then condensed under reduced pressure. The residual aqueous solution is extracted with chloroform, and the extract is washed with water, dried over anhydrous sodium sulfate and evaporated to dryness. The residue is passed through a column of silica gel and eluated with acetone, and the eluated material is crystallized from acetone-chloroform-ether to give 565 mg. of 3-(2-chloroethyl)-4-hydroperoxy - 2 - piperidino - tetrahydro-2H - 1,3,2 - oxazaphospholine 2-oxide as colorless prisms having M.P. 119° C. (decomp).

Analysis.—Calcd. for C$_{10}$H$_{20}$N$_2$O$_4$PCl (percent): C, 40.21; H, 6.75; N, 9.38; P, 10.37; Cl, 11.87. Found (percent): C, 40.49; H, 6.89; N, 9.35; P, 9.18; Cl, 11.82.

EXAMPLE 15

Into a solution of 2 g. of 3-butenyl N,N-bis(2-chloroethyl)-N-methyl-phosphorodiamidate in 6 ml. of acetone and 4 ml. of water is bubbled 498 mg. of ozone under ice-cooling, and then, there is added 2 ml. of 30% hydrogen peroxide. The mixture is allowed to stand overnight at room temperature and condensed under reduced pressure. The residue is extracted with chloroform, and the extract washed with water, dried and evaporated to dryness. The resulting crude crystals are recrystallized from acetone-ether to give 1.52 g. of 2-[bis(2-chloroethyl)amino]-4-hydroperoxy-2-methyl-tetrahydro-2H - 1,3,2 - oxazaphospholine 2-oxide having M.P. 99–100° C.

IR: $\nu_{max.}^{Nujol}$ 3200, 1290, 1260, 1220, 1197, 1048, 987, 907, 808 cm.$^{-1}$ Analysis.—Calcd. for C$_8$H$_{17}$N$_2$O$_4$PCl$_2$ (percent): C, 31.30; H, 5.58; N, 9.13; P, 9.90; Cl, 23.10. Found (percent): C, 31.52; H, 5.72; N, 9.02; P, 9.60; Cl, 22.81.

EXAMPLE 16

In the same manner as Example 15, 3-butenyl N,N-diethyl-N'-(2 - chloroethyl)phosphorodiamidate is oxidized with ozone to give 2-diethylamino-3-(2 - chloroethyl)-4-hydroperoxy-tetrahydro-2H - 1,3,2 - oxazaphospholine 2-oxide in 47.5% yield, M.P. 106–108° C.

IR: $\nu_{max.}^{Nujol}$ 3200, 1225, 1194, 1166, 1030, 976, 900, 810 cm.$^{-1}$

Analysis.—Calcd. for C$_9$H$_{20}$N$_2$O$_4$PCl (percent): C, 37.73; H, 7.03; N, 9.78; P, 10.82; Cl, 12.38. Found (percent): C, 37.89; H, 7.04; N, 9.75; P, 9.64; Cl, 12.36.

EXAMPLE 17

In the same manner as Example 15, 3-butenyl N,N,N'-tris-(2-chloroethyl)phosphorodiamidate is oxidized with ozone to give 2-[bis(2-chloroethyl)]amino-3-(2-chloroethyl)-4-hydroperoxy-tetrahydro-2H - 1,3,2 - oxazaphospholine 2-oxide in 57.0% yield, M.P. 115–117° C.

EXAMPLE 18

In the same manner as Example 15, 3-butenyl N-(2-chloroethyl) - N' - phenylphosphorodiamidate is oxidized with ozone to give 2-anilino-3-(2-chloroethyl)-4 - hydroperoxy-tetrahydro-2H-1,3,2 - oxazaphospholine 2-oxide as an oily material in 32.8% yield.

IR: $\nu_{max.}^{film}$ 3186, 1603, 1500, 1210, 1035, 760 cm.$^{-1}$

EXAMPLE 19

In the same manner as Example 15, 3-butenyl N-(2-chloroethyl)phosphorodiamidate is oxidized with ozone to give 2-(2-chloroethyl)amino - 4 - hydroperoxy - tetrahydro-2H-1,3,2-oxazaphospholine 2-oxide as an oily material in 11.5% yield.

IR: $\nu_{max.}^{Nujol}$ 3240, 1258, 1228, 1204, 1112, 1060, 970, 910, 815 cm.$^{-1}$

We claim:
1. A compound selected from the group consisting of cyclic phosphamide derivatives of the formula wherein $R^1$ is selected from the group consisting of hydrogen and 2-chloroethyl and $R^2$ is 2-chloroethyl; $R^3$ is a member selected from the group consisting of hydrogen, lower alkyl of up to 6 carbon atoms, 2-chloroethyl and phenyl; $R^4$ and $R^5$ are the same or different and are selected from the group consisting of hydrogen and lower alkyl of up to 6 carbon atoms; $n$ is 0 or 1.

2. 2-[bis(2-chloroethyl)amino]-4-hydroperoxy - 1,3,2-oxazaphospholidine 2-oxide.

3. 2-[bis(2-chloroethyl)amino]-3-(2 - chloroethyl) - 4-hydroperoxy-1,3,2-oxazaphospholidine 2-oxide.

4. 2-[bis(2-chloroethyl)amino]-4-methyl - 4 - hydroperoxy-1,3,2-oxazaphospholidine 2-oxide.

5. 2-[bis(2-chloroethyl)amino]-5 - methyl - 4 - hydroperoxy-1,3,2-oxazaphospholidine 2-oxide.

6. 2-[bis(2-chloroethyl)amino]-3-phenyl - 4 - hydroperoxy-tetrahydro-2H-1,3,2-oxazaphosphorine 2-oxide.

7. 2-(2-chloroethyl)amino-3-(2-chloroethyl)-4 - hydroperoxy-tetrahydro-2H-1,3,2-oxazaphosphorine 2-oxide.

8. 2-(2-chloroethyl)amino-4-hydroperoxy - tetrahydro-2H-1,3,2-oxazaphosphorine 2-oxide.

9. 2-[bis(2-chloroethyl)amino]-3-(2 - chloroethyl) - 4-hydroperoxy-tetrahydro-2H - 1,3,2 - oxazaphosphorine 2-oxide.

10. 2-[bis(2-chloroethyl)amino]-3-methyl - 4 - hydroperoxytetrahydro-2H-1,3,2-oxazaphosphorine 2-oxide.

11. A process for preparing cyclic phosphamide derivatives of the formula

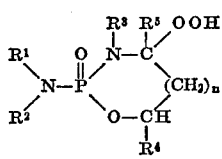

wherein $R^1$ is selected from the group consisting of hydrogen and 2-chloroethyl and $R^2$ is 2-chloroethyl; $R^3$ is a member selected from the group consisting of hydrogen atom, lower alkyl of up to 6 carbon atoms, 2-chloroethyl and phenyl; $R^4$ and $R^5$ are the same or different and are selected from the group consisting of hydrogen and lower alkyl of up to 6 carbon atoms; $n$ is 0 or 1; which comprises oxidizing a phosphorodiamidate of the formula:

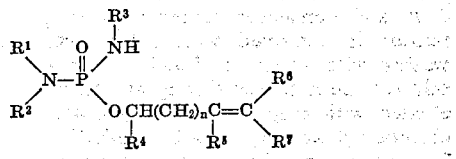

wherein $R^6$ and $R^7$ are the same or different and individually is a member selected from the group consisting of hydrogen atom, lower alkyl group, aralkyl group and aryl group; $R^1$, $R^2$, $R^3$, $R^4$, $R^5$ and $n$ each has the same meanings as mentioned above; with ozone in an inert solvent.

12. A process as claimed in claim 11, wherein the inert solvent is a member selected from the group consisting of methyl chloride, ethyl chloride, chloroform, methylene chloride, dichloroethane, tetrachloroethane, petroleum ether, n-hexane, cyclohexane, petroleum benzin, ligroin, benzene, toluene, tetrahydrofuran, dioxane, acetone, a mixture of these solvents, and their aqueous mixture.

13. A process as claimed in claim 11, wherein the oxidation is carried out at a temperature ranging from —20° C. to 35° C.

14. A process as claimed in claim 11, wherein a peroxide is added to the reaction mixture after the introduction of ozone.

15. A process as claimed in claim 14, wherein the peroxide is hydrogen peroxide.

References Cited
UNITED STATES PATENTS 3,018,302   1/1962   Arnold et al. _____ 260—936

OTHER REFERENCES

C.A. 75:2750S (1971), Subject Index (E–O).

HENRY R. JILES, Primary Examiner
S. D. WINTERS, Assistant Examiner

U.S. Cl. X.R.

260—968, 239 EP, 239 A, 326.61, 293.67, 247.5 R, 293.87, 293.79, 293.78, 956; 424—244, 248, 267, 274, 298